Patented Aug. 8, 1950

2,518,077

UNITED STATES PATENT OFFICE 2,518,077

AZO-DYESTUFFS

Max Schmid, Riehen, and Hans Johner, Basel, Switzerland, assignors to Ciba Limited, Basel, Switzerland, a Swiss firm No Drawing. Application March 19, 1947, Serial No. 735,792. In Switzerland March 8, 1946

Section 1, Public Law 690, August 8, 1946
Patent expires March 8, 1966

7 Claims. (Cl. 260—203)

According to this invention valuable new intermediate products are made by treating a compound of the general formula

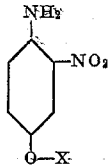

wherein X represents an aliphatic hydrocarbon radical, so as to convert the amino group into a hydroxyl group, and convert the latter into a group —O—Y, in which Y represents an aliphatic hydrocarbon radical different from X, and reducing the nitro group in the resulting compound to an amino group.

The compounds of the above formula used as starting materials may be obtained, for example, by nitrating a compound of the general formula

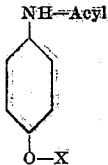

in which X has the meaning given above, and hydrolyzing the acylamino group, which may, for example, be a formylamino, acetylamino or benzoylamino group. The nitration may be carried out, for example, by means of dilute nitric acid or in a suitable organic solvent, such as glacial acetic acid, chlorobenzene or nitrobenzene, advantageously at a temperature ranging from 0° C. to 50° C. In this manner there is obtained a mixture of compounds of the general formula

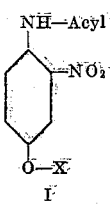

I and

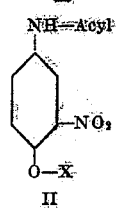

II

It is of advantage to separate the Compound II from the isomeric mixture only after subjecting the mixture to hydrolysis. The hydrolysis may be carried out, for example, in dilute caustic alkali at about 70° C. In this manner compounds of the Formula I are easily and practically completely hydrolyzed, whereas isomeric by-products of the Formula II remain practically unattacked. As the latter are generally of better solubility in water in the form of their acylamino-compounds they can be easily removed from the mixtures by dissolution in water.

There may be used as starting materials in the process of the invention compounds, for example, which have the general formula

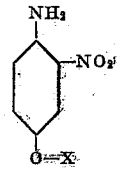

in which X represents an aliphatic hydrocarbon radical having only few carbon atoms, such as an ethyl or propyl radical. In some cases intermediate products especially well suited for the production of azo-dyestuffs are obtained by starting from compounds which contain in that position a methyl group.

The conversion of the amino group into a hydroxyl group in the starting materials used in the invention and having the general formula

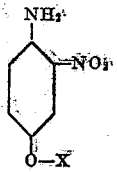

in which X represents an aliphatic hydrocarbon radical, may be carried out, for example, by heating under pressure in a dilute caustic alkali at a temperature ranging from 100° C. to 150° C.

The hydroxyl group in the resulting 1-nitro-2-hydroxy-5-alkoxybenzenes is etherified. This may be carried out, for example, by treating the compound in the form of an alkali phenolate with an alkyl halide or alkylene halide, such as a bromide and especially a chloride, or a dialkyl sulfate; in which treatment the alkyl radical of the alkylating agent must be different from the alkyl radical of the alkoxy group in the 5-position. The use of alkylating agents which contain 2-5 carbon atoms, branched chain compounds and unsaturated compounds coming also into consideration, leads to compounds which may be especially well suited as dyestuff intermediate products. For example, the following aliphatic hydrocarbon radicals may be introduced into the molecule: methyl, ethyl, propyl, isopropyl, allyl, butyl or amyl.

The nitro-compounds so obtained are reduced to the corresponding amino-compounds by methods in themselves known, for example, by means of iron in alcoholic solution.

The resulting amino-compounds are new and correspond to the general formula

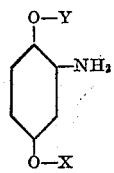

in which X and Y represent different aliphatic hydrocarbon radicals.

The compounds are valuable intermediate products for making dyestuffs, especially azo-dyestuffs. They may be used, among other uses, as so-called middle components in the manufacture of polyazo-dyestuffs, that is to say, they may be coupled with a diazo-compound and the resulting aminoazo-dyestuff diazotized and coupled with a suitable coupling component.

A method of use for which the amines of the last-mentioned formula are especially well suited consists in converting them into 2:3-hydroxynaphthoic acid arylides of the general formula

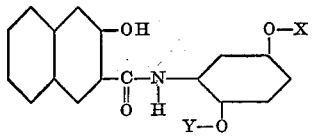

in which X and Y represent two different aliphatic radicals. These 2:3-hydroxynaphthoic acid arylides may be made by methods in themselves known, for example, by condensing a 2:3-hydroxynaphthoic acid halide, or a 2:3 hydroxynaphthoic acid itself with the aid of a phosphorus halide, with an amine of the aforesaid formula.

The 2:3-hydroxynaphthoic acid arylides so obtainable and having the general formula

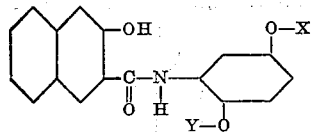

in which X and Y represent different aliphatic hydrocarbon radicals, may be coupled with un-sulfonated diazo-compounds to yield valuable new azo-dyestuffs.

As unsulfonated diazo-compounds for this purpose there come principally into consideration those which are suitable for making ice-colors. Especially good results can be obtained with those 2:3-hydroxynaphthoic acid arylides of the above formula in which X represents a methyl group and Y an aliphatic hydrocarbon radical of 2-5 carbon atoms.

The new azo-dyestuffs of the general formula

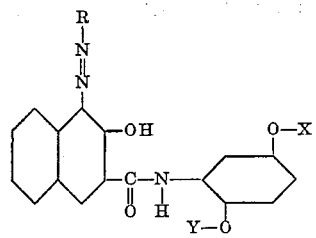

in which R represents the residue of a diazo-component free from sulfonic acid groups, and X and Y represent different aliphatic hydrocarbon radicals.

These products, especially when they are produced on the fiber, are distinguished by the valuable tints and remarkable properties of fastness of their dyeings. Especially valuable are the brownish tints which can be produced on the fiber with a halogenated aniline and the new 2:3-hydroxynaphthoic acid arylide of the formula

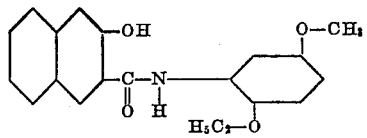

Tints having these properties of fastness cannot be obtained in a simpler manner.

The new products are also valuable as pigments, for example, for coloring artificial masses such as phenoplasts, aminoplasts or spinning masses.

The following examples illustrate the invention, the parts being by weight:

*Example 1*

1-amino-4-methoxybenzene is converted in known manner into its acetyl-derivative, the latter is nitrated in an organic solvent, such as glacial acetic acid, or in dilute nitric acid, and the acetyl group is split off from the resulting 3-nitro-4-acetylamino-1-methoxybenzene by hydrolysis by means of dilute caustic soda solution at 60–70° C. 168 parts of 1-amino-2-nitro-4-methoxybenzene are heated with 200 parts of caustic soda solution of 30 per cent. strength and 2000 parts of water at 120° C. for a few hours in an autoclave. The solution is then acidified. The resulting 1-hydroxy-2-nitro-4-methoxybenzene precipitates in the form of a yellow precipitate melting at 78–80° C. It may be separated by filtration and, if desired, purified by distillation with superheated steam or under reduced pressure.

169 parts of 1-hydroxy-2-nitro-4-methoxybenzene are dissolved in 400 parts of alcohol, 400 parts of water and 134 parts of caustic soda solution of 30 per cent. strength, 106 parts of sodium carbonate and 97 parts of ethyl chloride are added, and the whole is heated in an autoclave for 8 hours at 100–110° C. The alcohol is then removed by distillation, the residue is filtered cold, and washed with very dilute caustic soda solution until nothing further is dissolved. In this manner about 170 parts of 1-methoxy-3-nitro-4-ethoxybenzene are obtained in the form of a slightly gold-yellow crystalline mass melting at 42–45° C.

170 parts of 1-methoxy-3-nitro-4-ethoxybenzene are slowly introduced into a reduction liquor, which has been prepared by stirring 170 parts of powdered iron into 1000 parts of alcohol, adding 17 parts of hydrochloric acid of 30 per cent. strength, and boiling for ¼ hour in a reflux apparatus while stirring. The whole is then boiled for a few hours under reflux, while stirring, until the reduction is finished, 10 parts of sodium carbonate are added, and the whole is filtered hot to remove the residue. After removing the alcohol by distillation the base remains behind generally in the form of a somewhat dark colored oil, which upon cooling solidifies to a crystalline mass. For purification the base is distilled, preferably under reduced pressure. It is obtained in the form of a colorless oil, which solidifies to a white crystalline mass. Melting point 48–90° C. On exposure to air it slowly acquires a dark color again. In the form of the hydrochloride the base is stable towards the air.

The compounds in the following table can also be obtained by the process of this example:

benzene) are stirred in 120 parts of chlorobenzene, and the whole is heated up. At 70–80° C. 5.5 parts of phosphorus trichloride are slowly introduced dropwise. The whole is then heated at the boil for several hours in a reflux apparatus while stirring. It is then allowed to cool to 80° C., 1 part of sodium carbonate and 2 parts of sodium acetate are added, and the whole is distilled with steam, the arylide separating in the form of a precipitate. After all the chlorobenzene has been driven off, the aqueous suspension is filtered, and the arylide is well washed with hot water. It is dried, preferably under reduced pressure, and obtained in the form of a slightly yellowish white crystalline powder melting at 158–160° C.

In an analogous manner there are obtained from 2-aminohydroquinone-4-methyl-1-propyl ether, 2-(2':3'-hydroxynaphthoyl)-aminohydroquinone-1-propyl-4-methyl ether melting at 147–150° C.; from 2-aminohydroquinone-1-allyl-4-methyl ether, 2-(2':3'-hydroxynaphthoyl)-aminohydroquinone-1-allyl-4-methyl ether melting at 148–152° C.; and from 2-aminohydroquinone-1-butyl-4-methyl ether, 2-(2':3'-hydroxynaphthoyl)-aminohydroquinone-1-butyl-4-methyl ether melting at 135–138° C., and from 2-aminohydroquinone-1-methyl-4-ethyl ether 2-(2':3'-hydroxynaphthoyl)-aminohydroquinone-1-methyl-4-ethyl ether melting at 161–163° C.

| | Starting Material | Alkylating agent | Nitro-compound | Amine |
|---|---|---|---|---|
| 1 | NH₂, NO₂, O—C₂H₅ | Methyl chloride | O—CH₃, NO₂, O—C₂H₅. Melting point=40–42° C. Boiling point=178–180° C. under 14 mm. pressure. | O—CH₃, NH₂, O—C₂H₅. Melting point=71–73° C. Boiling point=150–152° C. under 14 mm. pressure. |
| 2 | NH₂, NO₂, O—CH₃ | Propyl chloride | O—C₃H₇, NO₂, O—CH₃. Melting point: oil. Boiling point=185–188° C. under 14 mm pressure. | O—C₃H₇, NH₂, O—CH₃. Melting point: oil. Boiling point=173–175° C. under 14 mm. pressure. |
| 3 | NH₂, NO₂, O—CH₃ | n-Butyl chloride | O—C₄H₉, NO₂, O—CH₃. Melting point: oil. Boiling point=178–183° C. under 14 mm. pressure. | O—C₄H₉, NH₂, O—CH₃. Melting point: oil. Boiling point=168–169° C. under 14 mm. pressure. |
| 4 | NH₂, NO₂, O—CH₃ | Allyl bromide | O—CH₂—CH=CH₂, NO₂, O—CH₃. Melting point: oil. Boiling at 170–180° C. under 14 mm. pressure. | O—CH₂—CH=CH₂, NH₂, O—CH₃. Melting point: oil. Boiling at 170–173° C. under 14 mm. pressure. |

*Example 2*

18.8 parts of 2:3-hydroxynaphthoic acid and 16.7 parts of 2-amino-hydroquinone-1-ethyl-4-methyl ether (1-methoxy-3-amino-4-ethoxy-

*Example 3*

15.75 parts of 4-chloro-2-amino-1-anisole are diazotized in known manner in the form of the hydrochloride in a hydrochloric acid suspension, and, if required, the diazonium salt solution is filtered after ½ hour to remove a small quantity of impurities. It is then run into a suspension of 35.1 parts of 1-(2':3'-hydroxynaphthoyl)-aminohydroquinone-2-propyl-5-methyl ether of the formula

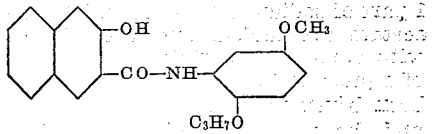

which has been made by dissolving 35.1 parts of the aforesaid arylide of 2:3-hydroxynaphthoic acid in 20 parts of caustic soda solution of 30 per cent. strength and 130 parts of hot water, diluting with water to 1000 parts by volume, adding an emulsifying agent, such as Turkey red oil, and acidifying with dilute acetic acid. Coupling occurs with a red coloration and the formation of the water-insoluble dyestuff. When the coupling is finished, the dyestuff is separated by filtration, well washed, and dried. It is a red powder.

*Example 4*

16.2 parts of 2:5-dichloraniline are diazotized in known manner with 25 parts of concentrated hydrochloric acid in aqueous suspension with 7 parts of sodium nitrite, and, if required, the diazonium salt solution is filtered after ½ hour to remove a small quantity of impurities. The solution is then run into a suspension of 33.7 parts of 1-(2':3'-hydroxynaphthoyl)-aminohydroquinone-2-ethyl-5-methyl ether of the formula

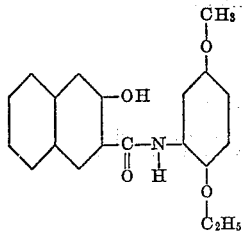

which has been made by dissolving 33.7 parts of the above 2:3-hydroxynaphthoic acid arylide in 20 parts of caustic soda solution of 30 per cent. strength and 130 parts of hot water, diluting with cold water to 1000 parts by volume and, if desired, after the addition of an emulsifying agent such as Turkey red oil, acidifying with dilute acetic acid. Coupling occurs with a beautiful orange-brown coloration and the formation of the insoluble dyestuff. When the coupling is finished the dyestuff is separated by filtration, well washed, and dried. It is an orange-brown powder.

*Example 5*

Cotton yarn is grounded in known manner with a solution containing, per litre, 3 grams of 1-(2':3'-hydroxynaphthoyl)-aminohydroquinone-2-ethyl-5-methyl ether and 2 grams of caustic soda solution of 30 per cent. strength. After ½ hour the yarn is well wound and, in order to develop the dyestuff, entered into a solution containing, per liter, 2 grams of diazotized 2:5-dichloraniline. After ½ hour the yarn is wound, well washed by rinsing hot and cold, then soaped, and finished in the usual manner. A beautiful bright orange-brown dyeing is obtained having very good properties of fastness.

The following is a list of further new dyestuffs which can be made, preferably on the fiber, with other diazo-components and 2:3-hydroxynaphthoic acid arylides obtainable by the invention:

From 1-(2':3'-hydroxynaphthoyl)-aminohydroquinone-2-ethyl-5-methyl ether and diazotized

| | |
|---|---|
| ortho-nitraniline | dull red |
| meta-chloraniline | brown scarlet |
| 4-nitro-2-amino-1-anisole | light red |
| 4-chloro-2-amino-1:1'-diphenyl ether | yellow red |
| 4-chloro-2-amino-1-anisole | bluish red |
| 4-chloro-2-amino-1-toluene | scarlet |
| Aminoazotoluene | bordeaux |
| 4-benzoylamino-5-methyl-2-methoxy-1-amino-benzene | dull dark red |
| 4-benzoylamino-2:5-diethoxy-1-aminobenzene | blue violet |

From 1-(2':3'-hydroxynaphthoyl)-aminohydroquinone-2-propyl-5-methyl ether and diazotized

| | |
|---|---|
| ortho-nitraniline | red |
| meta-chloraniline | scarlet |
| 4-nitro-2-amino-1-anisole | scarlet |
| 4-chloro-2-aminodiphenyl ether | scarlet |
| 2:5-dichloraniline | orange |
| 4-chloro-2-amino-1-toluene | scarlet |
| ortho-aminoazotoluene | bordeaux |
| 4-benzoylamino-5-methyl-2-methoxy-1-aminobenzene | dull bordeaux |
| 4-benzoylamino-2:5-diethoxy-1-aminobenzene | blue-violet |

From 1-(2':3'-hydroxynaphthoyl)-aminohydroquinone-2-butyl-5-methyl ether and diazotized

| | |
|---|---|
| ortho-nitraniline | brown orange |
| meta-chloraniline | bright orange |
| 2:5-dichloraniline | yellow scarlet |
| 4-chloro-2-amino-1:1'-diphenyl ether | scarlet |
| 4-chloro-2-amino-1-anisole | red |
| 5-nitro-2-amino-1-anisole | bluish red |
| 4-chloro-2-nitro-1-aniline | brownish red |
| 4-chloro-2-amino-1-toluene | scarlet |
| 4-methoxy-2-nitro-1-aniline | bordeaux |
| 4-benzoylamino-5-methyl-2-methoxy-1-aminobenzene | red-violet |
| 4-benzoylamino-2:5-diethoxy-1-aminobenzene | blue-violet |

From 1-(2':3'-hydroxynaphthoyl)-aminohydroquinone-2-methyl-5-ethyl ether and diazotized

| | |
|---|---|
| ortho-nitraniline | red |
| 2:5-dichloraniline | brownish scarlet |
| 4-chloro-2-amino-1:1'-diphenyl ether | scarlet |
| 4-chloro-2-amino-1-anisole | red |
| 5-nitro-2-amino-1-anisole | dark red |
| 4-chloro-2-amino-1-toluene | red |
| 4-methoxy-2-nitro-1-aniline | bordeaux |
| 4-benzoylamino-2:5-diethoxy-1-aminobenzene | dark blue |

What we claim is:

1. An azo-dyestuff of the general formula

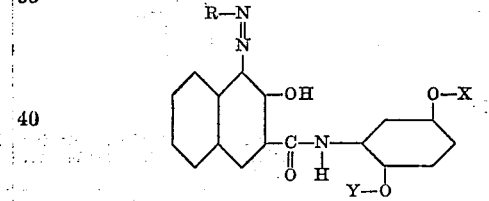

in which R represents the radical of an unsulfonated diazo-component of the benzene series suitable for the production of ice-colors, X represents an aliphatic hydrocarbon radical containing a maximum of 3 carbon atoms, and Y represents an aliphatic hydrocarbon radical different from X and containing a maximum of 5 carbon atoms.

2. An azo-dyestuff of the general formula

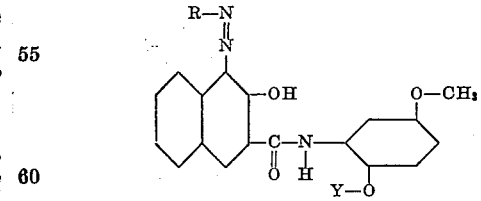

in which R represents the radical of an unsulfonated diazo-component of the benzene series suitable for the production of ice colors and Y represents an aliphatic hydrocarbon radical containing from 2 to 5 carbon atoms.

3. An azo-dyestuff of the general formula

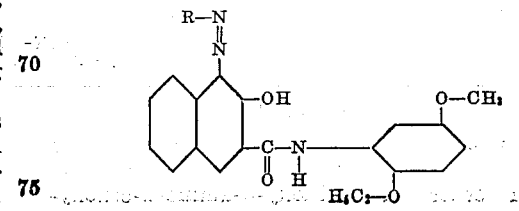

in which R represents the radical of an unsulfonated diazo-component of the benzene series suitable for the production of ice colors.

4. An azo-dyestuff of the general formula

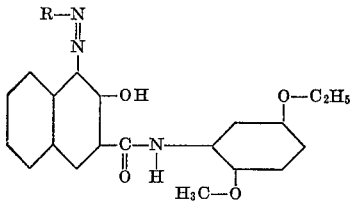

in which R represents the radical of an unsulfonated diazo-component of the benzene series suitable for the manufacture of ice colors.

5. The azo-dyestuff of the formula

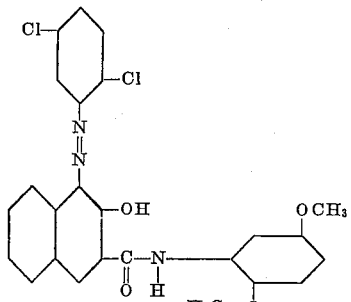

6. The azo-dyestuff of the formula

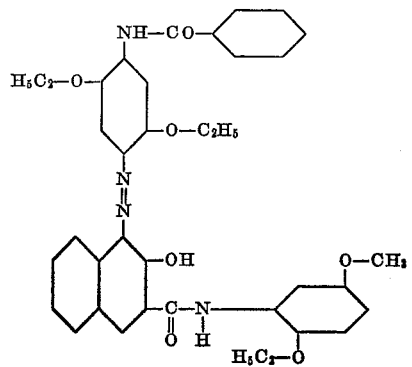

7. The azo-dyestuff of the formula

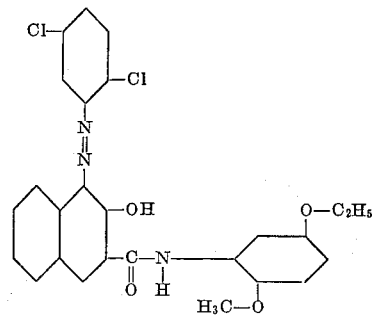

MAX SCHMID.
HANS JOHNER.

REFERENCES CITED

The following references are of record in the file of this patent:

UNITED STATES PATENTS

| Number | Name | Date |
|---|---|---|
| Re. 19,527 | Laska et al. | Apr. 9, 1935 |
| 1,758,340 | Wagner et al. | May 13, 1930 |
| 1,806,995 | Fitzky et al. | May 26, 1931 |
| 1,878,243 | Laska et al. | Sept. 20, 1932 |
| 1,921,361 | Laska et al. | Aug. 8, 1933 |
| 1,946,010 | Bonhote | Feb. 6, 1934 |
| 1,975,830 | Dahlen | Oct. 9, 1934 |

FOREIGN PATENTS

| Number | Country | Date |
|---|---|---|
| 193,834 | Great Britain | May 8, 1924 |
| 336,938 | Great Britain | Oct. 10, 1930 |
| 339,620 | Great Britain | Dec. 10, 1930 |
| 724,908 | France | Feb. 5, 1932 |
| 727,665 | France | Mar. 29, 1932 |
| 552,282 | Germany | June 10, 1932 |